(12) United States Patent
Wang et al.

(10) Patent No.: US 10,281,757 B2
(45) Date of Patent: May 7, 2019

(54) ULTRA-THIN TELEVISION

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Na Wang, Guangdong (CN); Cheng-Fa Chung, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 3 days.

(21) Appl. No.: 15/643,156

(22) Filed: Jul. 6, 2017

(65) Prior Publication Data

US 2018/0307083 A1  Oct. 25, 2018

(30) Foreign Application Priority Data

Apr. 25, 2017 (CN) .......................... 2017 1 0277599

(51) Int. Cl.
*F21V 8/00* (2006.01)
*H04N 5/64* (2006.01)
*G02F 1/1333* (2006.01)

(52) U.S. Cl.
CPC ...... *G02F 1/133308* (2013.01); *G02B 6/0088* (2013.01); *G02F 2001/13332* (2013.01); *G02F 2001/133314* (2013.01); *G02F 2001/133317* (2013.01); *H04N 5/64* (2013.01)

(58) Field of Classification Search
CPC ... G02F 1/133308; G02F 2001/133314; G02B 6/0088
See application file for complete search history.

(56) References Cited

U.S. PATENT DOCUMENTS

2012/0257107 A1* 10/2012 Itoh ..................... G02B 6/0085
348/553
2015/0042899 A1* 2/2015 Tomomasa ........ G02F 1/133308
348/790

FOREIGN PATENT DOCUMENTS

JP        2008-299181 A    12/2008

* cited by examiner

*Primary Examiner* — Lucy P Chien
(74) *Attorney, Agent, or Firm* — ScienBiziP, P.C.

(57) ABSTRACT

An ultra-thin television includes a backlight element, a base board and a radiating element. The backlight element includes at least one light source. The base board is positioned on a side of the backlight element. The base board includes a main body defining at least one radiating space and a metal plate covering the main body. Each of the at least one radiating space extends to the metal plate. The radiating element includes a first portion positioned on one side of the at least one light source and a second portion connecting to the first portion. The second portion corresponds to and is received in the at least one radiating space to connect to the metal plate.

14 Claims, 3 Drawing Sheets

ULTRA-THIN TELEVISION

CROSS-REFERENCE TO RELATED APPLICATIONS

This application claims priority to Chinese Patent Application No. 201710277599.7 filed on Apr. 25, 2017, the contents of which are incorporated by reference herein.

FIELD

The subject matter herein generally relates to ultra-thin television.

BACKGROUND

Ultra-thin televisions are popular. Usually, a thinner ultra-thin television is obtained by decreasing thicknesses of electronic components in the ultra-thin television, the electronic components can be liquid crystal display screen, power supply, or printed circuit boards. Improvement in the art is preferred.

BRIEF DESCRIPTION OF THE DRAWINGS

Implementations of the present technology will now be described, by way of example only, with reference to the attached figures.

DETAILED DESCRIPTION

Figure 1:
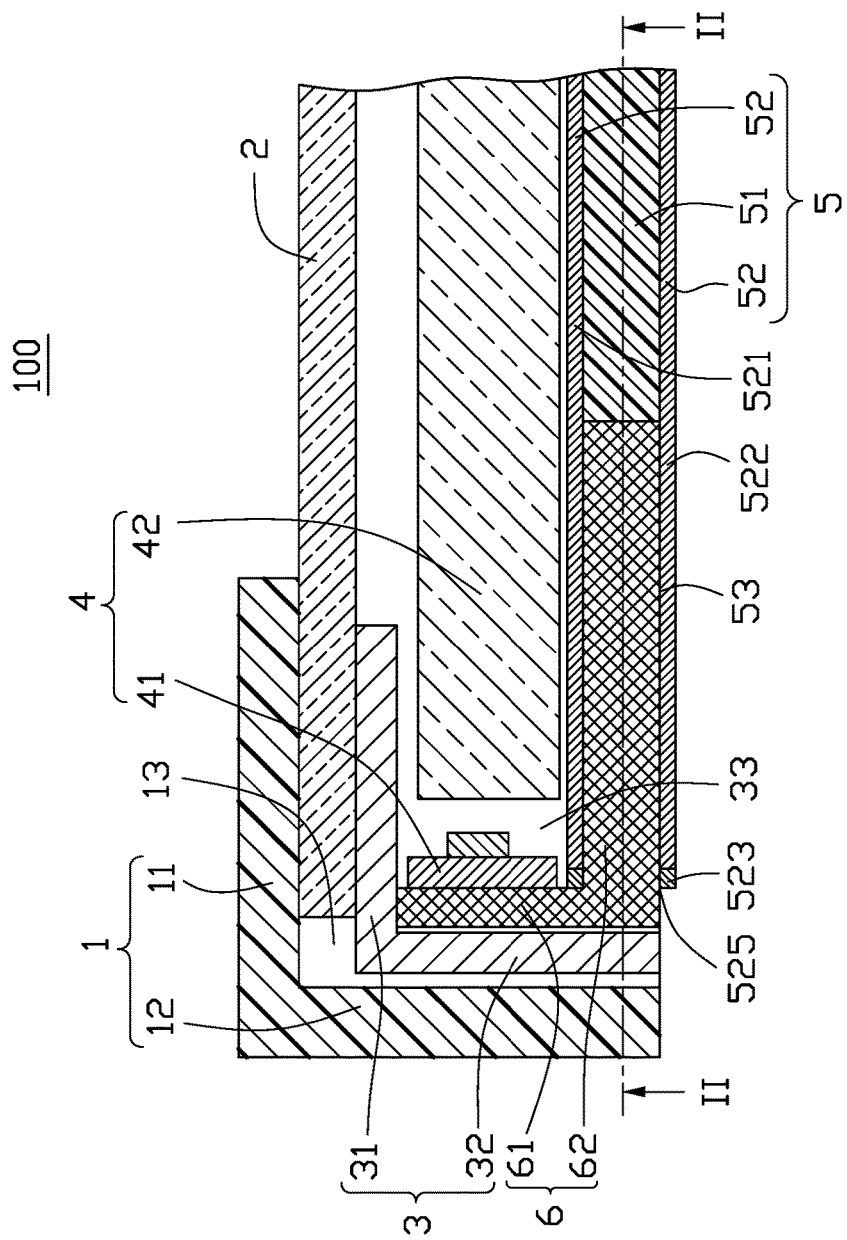
FIG. 1 is a cross-sectional view of a portion of an ultra-thin television according to a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain sections have been exaggerated to better illustrate details and features of the present disclosure.

Several definitions that apply throughout this disclosure will now be presented.

The term "substantially" is defined to be essentially conforming to the dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
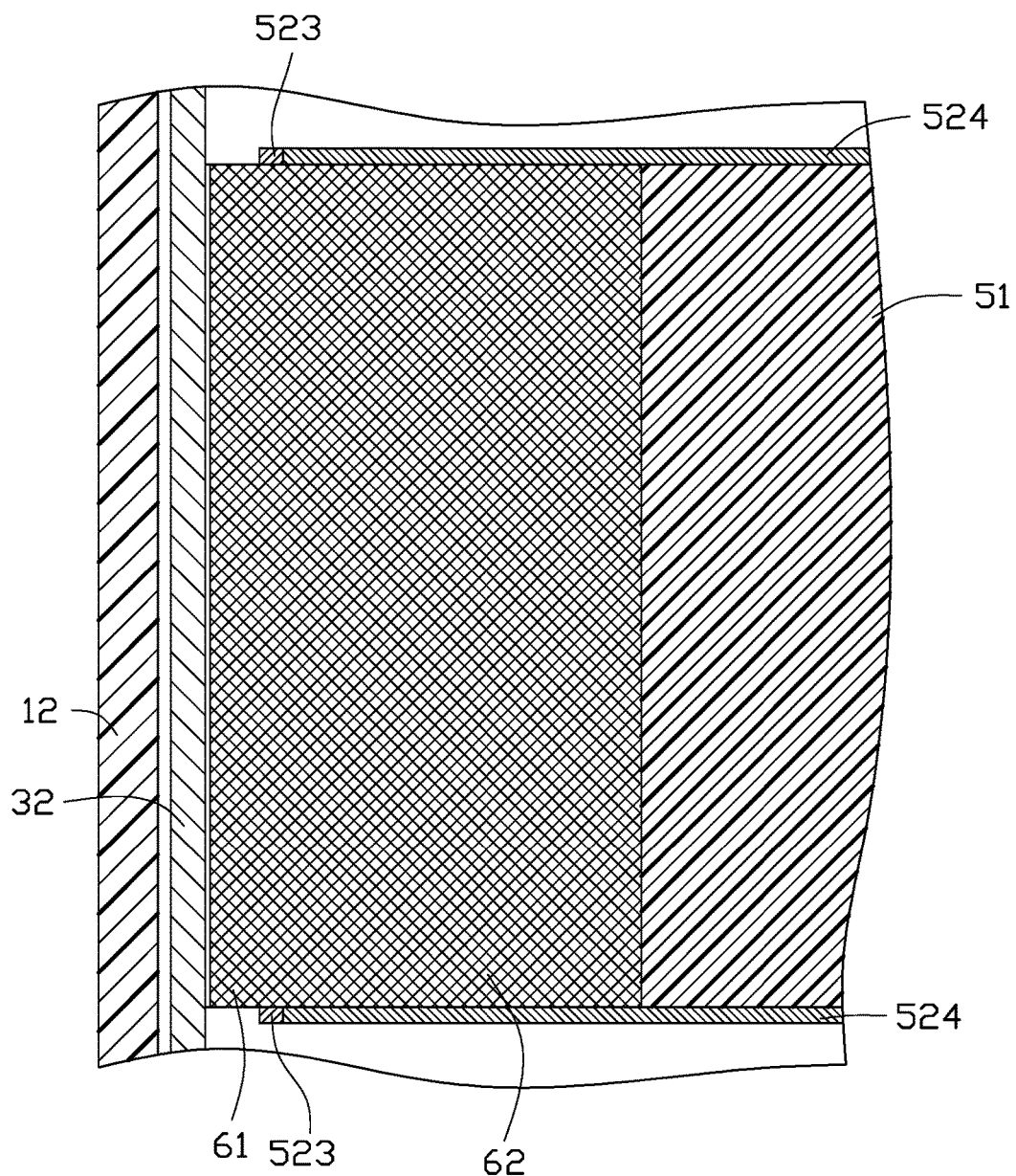
FIG. 2 is a cross-sectional view of a portion of the ultra-thin television of FIG. 1 along line II-II according to the first exemplary embodiment.

FIGS. 1 to 2 illustrate a first exemplary embodiment of an ultra-thin television 100 including a front frame 1, a liquid crystal display screen 2, a middle frame 3, a backlight element 4, a base board 5, and a radiating element 6. The front frame 1 includes a front board 11 and a plurality of side boards 12. The front board 11 and the plurality of side boards 12 cooperatively define a receiving space 13. The liquid crystal display screen 2, the middle frame 3, the backlight element 4, the base board 5 and the radiating element 6 are all received in the receiving space 13. A portion of the liquid crystal display screen 2 is exposed from the front board 11.

The middle frame 3 is positioned on a side of the liquid crystal display screen 2 away from the front board 11. The middle frame 3 includes a front plate 31 and a plurality of side plates 32. The liquid crystal display screen 2 is between the front board 11 and the front plate 31. The front plate 31 and the plurality of side plates 32 cooperatively define a housing 33. The backlight element 4, the base board 5 and the radiating element 6 are all received in the housing 33.

The backlight element 4 is positioned on a side <please S&R> of the front plate 31 away from the liquid crystal display screen 2. The backlight element 4 includes at least one light source 41 and a light guiding plate 42.

In this exemplary embodiment, the backlight element 4 is a side entry backlight element, and the at least one light source 41 is positioned on a side of the light guiding plate 42, thus the at least one light source 41 is positioned between one of the plurality of side plates 32 and the light guiding plate 42.

The base board 5 is positioned on a side of the backlight element 4 away from the liquid crystal display screen 2.

The base board 5 includes a main body 51 and a metal plate 52 covering the main body 51, thus the main body 51 is in inner of the base board 5.

Preferably, the main body 51 is made of resin, or is made of metallic material, which is different from the material of the metal plate 52.

Preferably, the metal plate 52 is made of aluminum.

In this exemplary embodiment, the metal plate 52 includes a top metal sheet 521 near the backlight element 4, a bottom metal sheet 522 opposite to the top metal sheet 521 and away from the backlight element 4, a first side metal sheet 523 connecting the top metal sheet 521 and the bottom metal sheet 522, and two second side metal sheets 524 connecting the first side metal sheet 523. The first side metal sheet 523 position near one of the plurality of side plates 32 near the light source 41. The first side metal sheet 523 defines at least one opening 525. The base board 5 defines at least one radiating space 53 in inner portion thereof. Each of the at least one radiating space 53 extends to at least one metal sheet of the metal plate 52, and is in air communication with one of the at least one opening 525.

Preferably, the top metal sheet 521, the bottom metal sheet 522 are separately and seamlessly connect to the first side metal sheet 523 and the two second side metal sheets 524.

Preferably, each of the at least one radiating space 53 extends through the main body 51 of the base board 5, such as the at least one radiating space 53 extends to the top metal sheet 521 and the bottom metal sheet 522; alternatively, the at least one radiating space 53 extends to the two second side metal sheets 524; alternatively, each of the at least one radiating space 53 extends to the two second side metal sheets 524, the top metal sheet 521 and the bottom metal sheet 522.

In this exemplary embodiment, a number of the at least one radiating space 53 is one. The radiating space 53 extends to the top metal sheet 521, the bottom metal sheet 522, and the two second side metal sheets 524.

The radiating element 6 includes a first portion 61 and a second portion 62 connecting to the first portion 61 near the at least one opening 525. The first portion 61 is positioned on a side of the light source 41 away from the light guiding plate 42 and is in contact with the light source 41. The second portion 62 corresponds to and is received in the at least one radiating space 53, and is thus connecting to the metal plate 52.

In this exemplary embodiment, the second portion 62 connects to the top metal sheet 521, the bottom metal sheet 522, and the two second side metal sheets 524.

In this exemplary embodiment, the first portion 61 is positioned between the light source 41 and one side plate 32 near the light source 41.

Preferably, the first portion 61 seamlessly connects to the second portion 62.

In this exemplary embodiment, the first portion 61 substantially and perpendicularly connects to the second portion 62, for the backlight element 4 is a side entry backlight element.

The base board 5 can further include at least one locking element (not shown).

Figure 3:
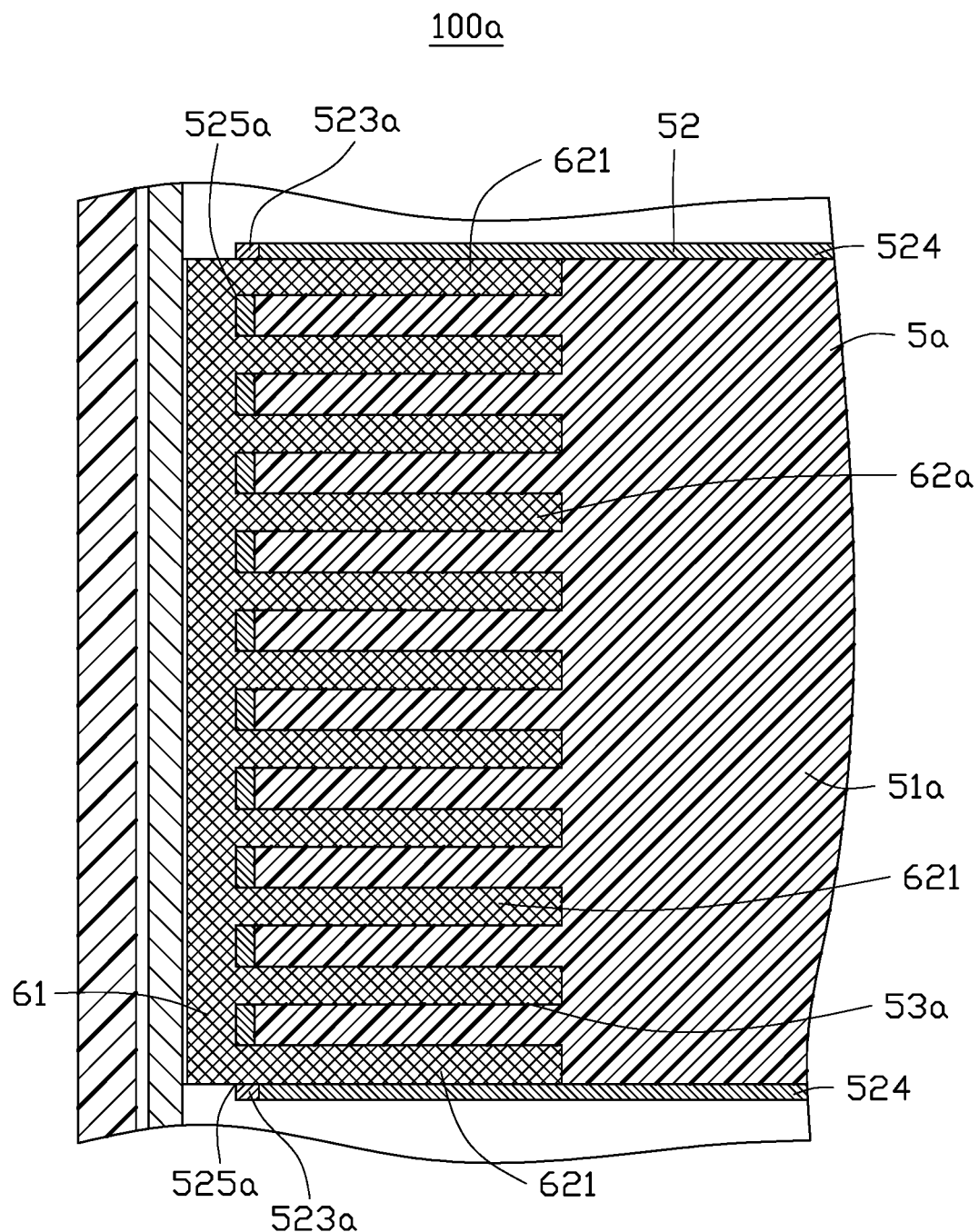
FIG. 3 is a cross-sectional view of a portion of a second exemplary embodiment of the ultra-thin television.

FIG. 3 illustrates a second exemplary embodiment of an ultra-thin television 100a. The ultra-thin television 100a in the second exemplary embodiment is similar to the ultra-thin television 100 in the first exemplary embodiment, where the differences include: a number of the at least one radiating space 53a and a number of the at least one opening 525a are each more than one in the second exemplary embodiment. Each of the radiating spaces 53a corresponds to and is in air communication with one opening 525a. The radiating spaces 53a are substantially parallel to each other. Each of the radiating spaces 53a connects to the top metal sheet 521 and the bottom metal sheet 522, similar as shown in FIG. 1. The second portion 62a includes a plurality of branches 621 connecting to the first portion 61a. Each of the plurality of branches 621 corresponds to and is received in one radiating space 53a.

In this exemplary embodiment, two outermost side radiating spaces 53a separately extend to the two second side metal sheets 524, thus two outermost side branches 621 separately and closely connect to the two second side metal sheets 524.

In other exemplary embodiments, the radiating spaces 53a can be arranged in a different pattern.

A thickness of the ultra-thin television 100 (100a) is decreased by positioning the second portion 62 into the radiating spaces 53 in the base board 5. Heat from the light source 41 can be dissipated through the first portion 61, the second portion 62, and the metal plate 52.

The exemplary embodiments shown and described above are only examples. Many details are often found in the art such as the other features of an ultra-thin television. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the exemplary embodiments described above may be modified within the scope of the claims.

What is claimed is:

1. An ultra-thin television, comprising:
    a backlight element comprising at least one light source;
    a base board positioned on a side of the backlight element, comprising:
        a main body defining at least one radiating space; and
        a metal plate covering the main body;
        wherein each of the at least one radiating space extends to the metal plate; and
    a radiating element, comprising:
        a first portion positioned on one side of the at least one light source; and
        a second portion connecting to the first portion, the second portion corresponding to and received in the at least one radiating space to connect to the metal plate;
        wherein the metal plate comprises a top metal sheet near a side of the backlight element, a bottom metal sheet opposite to the top metal sheet and away from the backlight element, a first side metal sheet connecting the top metal sheet and the bottom metal sheet, and two second side metal sheets connecting the first side metal sheet, the first side metal sheet faces the first portion;
        wherein a number of the at least one radiating space is more than one, the radiating spaces are substantially parallel to each other, each of the radiating spaces extends to the top metal sheet and the bottom metal sheet the second portion comprises a plurality of branches connecting to the first portion, each of the plurality of branches corresponds to and is received in one radiating space.

2. The ultra-thin television of claim 1, wherein the main body is made of resin, or is made of a metallic material different from the material of the metal plate.

3. The ultra-thin television of claim 1, wherein the metal plate is made of aluminum.

4. The ultra-thin television of claim 1, wherein each of the at least one radiating space extends through the main body of the base board.

5. The ultra-thin television of claim 1, wherein the first side metal sheet defines at least one opening, each of the at least one radiating space is in air communication with one of the at least one opening, the second portion connects to the first portion through the at least one opening.

6. The ultra-thin television of claim 1, wherein each of the at least one radiating space extends to the top metal sheet and the bottom metal sheet, the second portion connects to the top metal sheet and the bottom metal sheet.

7. The ultra-thin television of claim 1, wherein each of the at least one radiating space extends to the two second side metal sheets, and the second portion connects to the two second side metal sheets.

8. The ultra-thin television of claim 1, wherein two outermost side radiating spaces separately extend to the two second side metal sheets; two outermost side branches separately and closely connect to the two second side metal sheets.

9. The ultra-thin television of claim 1, wherein the top metal sheet, the bottom metal sheet, are separately and seamlessly connected to the first side metal sheet and the two second side metal sheets.

10. The ultra-thin television of claim 1, further comprising a front frame, a liquid crystal display screen, and a middle frame; wherein the liquid crystal display screen and the middle frame is received in the front frame; wherein the backlight element, the base board, and the radiating element is received in the middle frame.

11. The ultra-thin television of claim 1, wherein the backlight element is a side entry backlight element, and the at least one light source is positioned on a side of the light guiding plate, and the first portion substantially and perpendicularly connects to the second portion.

12. The ultra-thin television of claim 1, wherein the first portion seamlessly connects to the second portion.

13. An ultra-thin television, comprising:
   a backlight element comprising a light guiding plate and at least one light source facing the light guiding plate;
   a base board, comprising:
      a main body on a side of the light guiding plate, the main body defining at least one radiating space; and
      a top metal sheet on a side of the main body adjacent to the light guiding plate and covering the main body;
      a bottom metal sheet on a side of the main body away from the light guiding plate, the main body made of a resin and between the top metal sheet and the bottom metal sheet; each of the at least one radiating space extending through the main body and connecting both the top metal sheet and the bottom metal sheet;
   a radiating element, comprising:
      a first portion connecting to the at least one light source; and
      a second portion connecting to the first portion, the second portion received in the at least one radiating space to connect to both the top metal sheet and the bottom metal sheet.

14. The ultra-thin television of claim 13, wherein both the top metal sheet and the bottom metal sheet are made of aluminum.

* * * * *